US012167311B2

(12) United States Patent
Ke et al.

(10) Patent No.: US 12,167,311 B2
(45) Date of Patent: Dec. 10, 2024

(54) METHOD FOR SERVICE OPTIMIZATION AND COMMUNICATIONS DEVICE

(71) Applicant: VIVO MOBILE COMMUNICATION CO., LTD., Guangdong (CN)

(72) Inventors: Xiaowan Ke, Chang'an Dongguan (CN); Xiaodong Yang, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 333 days.

(21) Appl. No.: 17/669,228

(22) Filed: Feb. 10, 2022

(65) Prior Publication Data

US 2022/0167143 A1 May 26, 2022

Related U.S. Application Data

(63) Continuation of application No. PCT/CN2020/108642, filed on Aug. 12, 2020.

(30) Foreign Application Priority Data

Aug. 12, 2019 (CN) .......................... 201910741458.5

(51) Int. Cl.
*H04W 4/90* (2018.01)
*H04W 60/06* (2009.01)
(Continued)

(52) U.S. Cl.
CPC ............. *H04W 4/90* (2018.02); *H04W 60/06* (2013.01); *H04W 76/38* (2018.02); *H04W 76/50* (2018.02)

(58) Field of Classification Search
CPC ....... H04W 4/90; H04W 76/15; H04W 88/06; H04W 8/18
(Continued)

(56) References Cited

U.S. PATENT DOCUMENTS

2011/0142207 A1  6/2011  Goldman et al.
2014/0256283 A1  9/2014  Lin et al.
(Continued)

FOREIGN PATENT DOCUMENTS

CN      101841793     *  3/2009  ............. H04W 4/90
CN      101772968  A    7/2010
(Continued)

OTHER PUBLICATIONS

CN Office Action in Application No. 201910741458.5 Dated Dec. 24, 2020.
(Continued)

*Primary Examiner* — Maria El-Zoobi
(74) *Attorney, Agent, or Firm* — BROOKS KUSHMAN P.C.

(57) ABSTRACT

Embodiments of the present disclosure provide a method for service optimization and a communications device. The method for service optimization applied to a first communications device includes: performing a waiting-related operation before performing a first operation, where the waiting-related operation is any one of the following: an operation of waiting for a first time period; an operation, before the first time period is overrun, when a first condition is satisfied, of stopping waiting for the first time period; and an operation of waiting for an incoming call, where the first time period is a time period starting from a time point at which an emergency service is ended.

15 Claims, 2 Drawing Sheets

Perform a waiting-related operation before performing a first operation  — 11

(51) Int. Cl.
   *H04W 76/38*      (2018.01)
   *H04W 76/50*      (2018.01)
(58) Field of Classification Search
   USPC ..................................................... 455/404.1
   See application file for complete search history.

(56) References Cited

U.S. PATENT DOCUMENTS

| | | | |
|---|---|---|---|
| 2015/0245309 A1* | 8/2015 | Nayak | H04W 8/183 |
| | | | 455/435.3 |
| 2017/0230809 A1 | 8/2017 | Dm et al. | |
| 2018/0278747 A1 | 9/2018 | Chiang et al. | |

FOREIGN PATENT DOCUMENTS

| | | |
|---|---|---|
| CN | 101835127 A | 9/2010 |
| CN | 101841793 A | 9/2010 |
| CN | 101867899 A | 10/2010 |
| CN | 102036207 A | 4/2011 |
| CN | 101841793 B | 2/2013 |
| CN | 107360558 A | 11/2017 |
| CN | 108347695 A | 7/2018 |

OTHER PUBLICATIONS

Written Opinion and International Search Report in Application No. PCT/CN2020/108642 Dated Oct. 30, 2020.
European Search Report in Application No. 20851665.8 Dated Jun. 20, 2022.

\* cited by examiner

METHOD FOR SERVICE OPTIMIZATION AND COMMUNICATIONS DEVICE

CROSS-REFERENCE OF RELATED APPLICATION

This application is a continuation application of International Application No. PCT/CN2020/108642 filed on Aug. 12, 2020, which claims priority to Chinese Patent Application No. 201910741458.5, filed on Monday, Aug. 12, 2019 in China, which are incorporated herein by reference in their entireties.

TECHNICAL FIELD

Embodiments of the present disclosure relate to the field of wireless communications technologies, and in particular, to a method for service optimization and a communications device.

BACKGROUND

In a network in a related technology, a dual standby SIM terminal such as a mobile phone has become increasingly commonly used. However, due to the lack of inter-network negotiation for adaption, user experience is not optimized to be satisfying enough. For example, there may be paging conflict and the like. How to optimize user experience with a dual SIM terminal is an urgent technical problem to be resolved at present.

SUMMARY

Embodiments of the present disclosure provide a method for service optimization and a communications device, to resolve the problem of optimizing user experience with a dual SIM terminal.

To resolve the technical problems, the present disclosure is implemented as follows:

According to a first aspect, an embodiment of the present disclosure provides a method for service optimization, applied to a first communications device, and including:
  performing a waiting-related operation before performing a first operation, where
  the waiting-related operation is any one of the following:
  an operation of waiting for a first time period;
  an operation, before the first time period is overrun, when a first condition is satisfied, of stopping waiting for the first time period; and
  an operation of waiting for an incoming call, where
    the first time period is a time period starting from a time point at which an emergency service is ended.

According to a second aspect, an embodiment of the present disclosure provides a method for service optimization, applied to a second communications device, and including:
  sending first time period-related information, where
  the first time period is a time period starting from a time point at which an emergency service is ended.

According to a third aspect, an embodiment of the present disclosure provides a communications device, where the communications device is a first communications device, including:
  an execution module, configured to perform a waiting-related operation before performing a first operation, where
  the waiting-related operation is any one of the following:
  an operation of waiting for a first time period;
  an operation, before the first time period is overrun, when a first condition is satisfied, of stopping waiting for the first time period; and
  an operation of waiting for an incoming call, where
    the first time period is a time period starting from a time point at which an emergency service is ended.

According to a fourth aspect, an embodiment of the present disclosure provides a communications device, where the communications device is a second communications device, including:
  a sending module, configured to send first time period-related information, where
  the first time period is a time period starting from a time point at which an emergency service is ended.

According to a fifth aspect, an embodiment of the present disclosure provides a communications device, including a processor, a memory, and a computer program stored in the memory and executable on the processor. The computer program, when executed by the processor, implements the steps of the foregoing method for service optimization.

According to a sixth aspect, an embodiment of the present disclosure provides a computer-readable storage medium, where the computer-readable storage medium stores a computer program, and the computer program, when executed by a processor, implements the steps of the foregoing method for service optimization.

In the embodiments of the present disclosure, after a secondary card of a terminal completes an emergency call, performing of an operation related to returning to a primary card may be waited for a period of time, to deal with an emergency callback to the secondary card, such that dual SIM optimization is supported to optimize user experience with a dual SIM terminal.

BRIEF DESCRIPTION OF THE DRAWINGS

For a person of ordinary skill in the art, various other advantages and benefits will become clearer by reading detailed descriptions of the following optional implementations. The accompanying drawings are merely used for illustrating the optional implementations, and are not considered as a limitation on the present disclosure. In all the accompanying drawings, a same reference symbol is used to indicate a same part. In the accompanying drawings.

DETAILED DESCRIPTION OF EMBODIMENTS

Figure 1:
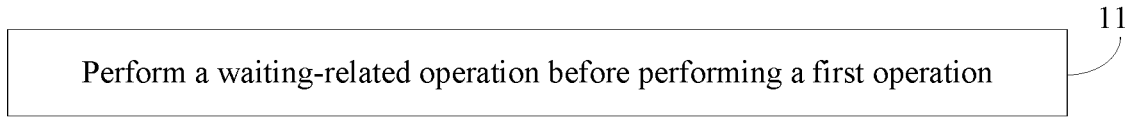
FIG. 1 is a schematic flowchart of a method for service optimization according to an embodiment of the present disclosure.

The technical solutions in embodiments of the present disclosure are described below clearly with reference to the accompanying drawings in the embodiments of the present disclosure. Clearly, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the description and the claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or an explanation. Any embodiment or design scheme described as an "exemplary" or "example" in the embodiments of the present disclosure should not be explained as being more preferred or having more advantages than another embodiment or design scheme. To be exact, use of the term such as "example" or "for example" is intended to present a relevant concept in a specific manner.

In the embodiments of the present disclosure, a multi-card terminal may be capable of using one card for sending and both for receiving, using one card for sending and the other for receiving, and using both cards for sending and receiving. For a terminal that is only capable of using one card for sending (such as using one card for sending and the other for receiving or using one card for sending and both for receiving), only one card can be active, and there is a matter of selecting one card between a first card and a second card. For fast switching between two cards. the terminal may actively initiate radio resource control (RRC) connection suspend or RRC connection release after a service of one card is ended.

Generally, for a dual SIM terminal, one card is set as a data card, which is a primary card, and the other card is a secondary card. A user may select the primary card or the secondary card to initiate an IP multimedia subsystem (IMS) phone call. For example, a WeChat call is usually implemented on a data card.

After an IMS phone call based on the secondary card is ended, the terminal returns to the primary card. In this case, the terminal may perform one of the following:
  detachment (Detach) of the secondary card; and
  a request of suspending or releasing an RRC connection of the secondary card.

In a case in which the IMS phone call based on the secondary card is an emergency call, after a session of the emergency call is ended, if the terminal immediately requests the detachment of the secondary card, the terminal returns to the primary card. In this case, when there is an emergency callback to the secondary card, the call cannot go through. It should be noted that the detachment herein is not detachment caused by turning down the terminal or the card is taken out of the terminal, or the like.

When the IMS phone call is an emergency call, an emergency callback is usually followed. After a session of the emergency call is ended, if the terminal immediately requests an RRC connection of the secondary card be suspended, the terminal returns to the primary card. When there is an emergency callback, a network needs to page the secondary card again, and the terminal receives an RRC connection that requires an immediate request of primary card suspend after the paging, and recovers the RRC connection of the secondary card.

Because there is a high probability of an emergency callback, the foregoing operation is not necessary. In addition, for a terminal in a mode of using one card for receiving, there is a probability of encountering paging conflicts and being unable to monitor paging in a dual SIM case, which impacts an emergency callback.

To ensure that an emergency callback goes well, a method for guarantee may be that: After a session of an emergency call based on the secondary card is ended, the terminal waits for a period of time before performing one of the following: detachment (Detach) of the secondary card; and a request of suspending or releasing an RRC connection of the secondary card. The time for waiting may be set by the terminal, or may be given by a network at an emergency attachment side. Further, there is an exception before the time for waiting is overrun: If a user selects the primary card for calling, to ensure that the primary card can initiate a voice service, it is the primary card that must be switched to, and the RRC connection of the secondary card should be immediately released or suspended.

In the embodiments of the present disclosure, optionally, an action of obtaining may be understood as obtaining by a configuration, obtaining through receiving, obtaining after receiving by a request, obtaining through self-learning, obtaining through inferring based on information that is not received, or obtaining after processing based on received information. This may be specifically determined based on an actual requirement, and is not limited in the embodiments of the present disclosure. For example, when specific capability indication information sent by a device is not received, it may be inferred that the device does not support the capability.

Optionally, an action of sending may include broadcasting, broadcasting in a system message, and returning after responding to a request.

In an embodiment of the present disclosure, an emergency service may be referred to as an emergency voice service.

In an embodiment of the present disclosure, a voice service may include an IMS voice service. The IMS voice service may include at least one of the following: an IMS voice service according to 3GPP, and an IMS voice service not according to 3GPP:

In an embodiment of the present disclosure, a communications network element may include at least one of the following: a core network network element and a radio access network network element.

In an embodiment of the present disclosure, a network element of a first network (or referred to as a first network network element) includes at least one of the following: a core network network element of the first network, and a radio access network network element of the first network. A network element of a second network (or referred to as a second network network element) includes at least one of the following: a core network network element of the second network, and a radio access network network element of the second network.

In an embodiment of the present disclosure, a first network may be a public network, and a second network may be a non-public network; a first network may be a non-public network, and a second network may be a public network; a first network may be a first non-public network, and a second network may be a second non-public network; or a first network may be a first public network, and a second network may be a second public network.

In an embodiment of the present disclosure, NPN is short for a non-public network. The non-public network may be referred to as one of the following: a non-public communications network. The non-public network may be deployed as at least one of the following: a physical non-public network, a virtual non-public network, and a non-public network implemented in a public network. In an implementation, the non-public network is a closed access group (CAG). One CAG may include a group of terminals.

In an embodiment of the present disclosure, the non-public network may include or be referred to as a private network. The private network may be referred to as one of the following: a private communications network, a private network, a local area network (LAN), a private virtual network (PVN), an isolated communications network, a dedicated communications network, or another name. It should be noted that a naming manner is not specifically limited in the embodiments of the present disclosure.

In an embodiment of the present disclosure, PN is short for a public network. The public network may be referred to as one of the following: a public communications network or another name.

In an embodiment of the present disclosure, when a physical terminal has a plurality of SIM cards or a plurality of subscriptions, a plurality of logic terminals (such as UEs) may be formed based on the terminal with each SIM card or subscription. The SIM card may be a card placed in a card slot of the terminal device, or an electronic card in the terminal device. In an optional embodiment of the present disclosure, the SIM card may include one of the following: a SIM card, a USIM card, and an eSIM. The SIM card may have another name, which is not limited in the present disclosure. For a terminal with two SIM cards, one card may be a primary card, and the other may be a secondary card.

In an optional implementation manner, UE is a subscriber. One terminal device may be configured with a plurality of subscribers. The subscriber may be embodied by a SIM (Subscriber Identity Module) card. One SIM card corresponds to one subscriber of one network. A SIM card stores an identifier of a subscriber, that is, an identifier of UE, for example, a subscription permanent identifier (SUPI), or an international mobile subscription identity (IMSI). Therefore, when one terminal is inserted with a plurality of SIM cards or configured with information of a plurality of electronic SIM cards, the terminal with different subscribers may form different UEs.

In another implementation, UE may be one of the following: a terminal formed by a terminal device with a subscriber, a terminal device, a SIM card, a subscriber corresponding to a SIM card, and a terminal formed by a terminal device with a SIM card.

In an optional embodiment of the present disclosure, a first subscription and a second subscription may be two subscriptions of a same terminal device. From the perspective of a network, a subscription means UE. The first subscription may be referred to as first UE, and the second subscription may be referred to as second UE.

In an optional embodiment of the present disclosure, a terminal device and a terminal may have a same meaning. In an optional embodiment of the present disclosure, a subscription (or Subscriber) may include at least one of the following: a SIM card, a subscriber corresponding to a SIM card, UE associated with a SIM card, a terminal device, a terminal device with a subscriber, a terminal device with a SIM card.

In an optional embodiment of the present disclosure, a communications device may include at least one of the following: a communications network element and a terminal. In an implementation, the terminal includes UE.

In an embodiment of the present disclosure, a communications network element may include at least one of the following: a core network network element and a radio access network network element.

In the embodiments of the present disclosure, the core network network element (a CN network element) may include, but is not limited to, at least one of the following: a core network device, a core network node, a core network function, a core network network element, a mobility management entity (MME), an access management function (AMF), a session management function (SMF), a user plane function (UPF), a serving gateway (serving GW, SGW), a PDN gateway, a policy control function (PCF), a policy and charging rules function (PCRF) unit, a serving GPRS support node (SGSN), a gateway GPRS support node (GGSN), a unified data management (UDM), a unified data repository (UDR), a home subscriber server (HSS), and an application function (AF).

In the embodiments of the present disclosure, the RAN network element may include, but is not limited to, at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (evolved NodeB, eNB), a 5G base station (gNB), a radio network controller (Radio Network Controller, RNC), a NodeB, a non-3GPP interworking function (N3IWF), an access controller (AC) node, an access point (AP) device and a wireless local area network (WLAN) node.

In the embodiments of the present disclosure, a proxy network element is a proxy network element, for example, N3IWF, for interaction between a first network and a second network. The proxy network element may be a network element of a first network element or a second network element.

The base station may be a base transceiver station (BTS) in GSM or CDMA, or may be a NodeB in WCDMA, or may be an evolved NodeB (evolutional Node B, Node eNB or e-NodeB) in LTE and a 5G base station (gNB). This is not limited in the embodiments of the present disclosure.

In the embodiments of the present disclosure, the terminal may include a relay that supports a terminal function and/or a terminal that supports a relay function. The terminal may further include a terminal device or user equipment (UE). The terminal may be a mobile phone, a tablet personal computer, a laptop computer, a personal digital assistant (PDA), a mobile internet device (MID), a wearable device, a vehicle-mounted device, or another terminal side device. It should be noted that a specific type of the terminal is not limited in the embodiments of the present disclosure.

The following describes the method for service optimization in the embodiments of the present disclosure.

Refer to FIG. 1. An embodiment of the present disclosure provides a method for service optimization, applied to a first communications device, where the first communications device includes, but is not limited to a terminal. As shown in FIG. 1, the method includes:

Step 11: performing a waiting-related operation before performing a first operation.

The waiting-related operation may be any one of the following:

an operation of waiting for a first time period;

an operation, before the first time period is overrun, when a first condition is satisfied, of stopping waiting for the first time period; and an operation of waiting for an incoming call.

The first time period is a time period or duration starting from a time point at which an emergency service is ended. The end of the emergency service may include any one of the following: an end of an emergency call, a release of a PDU session of an emergency call, and a release of a PDN connection of an emergency call.

In an implementation, after the first time period is overrun, the first operation may be performed.

In an implementation, waiting for the first time period may be implemented by starting a first time period timer, and after the timer has expired, the first operation may be performed.

In another implementation, waiting for the first time period may be implemented by setting an ending time point of the first time period, and after the ending time point of the first time period has been arrived, the first operation may be performed.

Optionally, the first time period may be configured by the first communications device, that is, the first time period may be a time period pre-configured by the first communications device, or the first time period may be obtained from first time period-related information received from a second communications device. The second communications device is, for example, a network element of a first network. The network element of the first network may include any one of the following: a RAN network element, and a CN network element (such as MME or AMF).

In an implementation, the first time period-related information may include one of the following: duration for waiting, and an ending time point of waiting.

Optionally, the first condition may include at least one of the following:
an incoming call is received but not taken;
an incoming call is received but refused to be taken; and
an incoming call is received and taken, and the incoming call is ended, where
the first communications device initiates an outgoing call by using a second subscription.

In an implementation, the incoming call may be an emergency callback.

In an implementation, before the first time period is overrun, the outgoing call is received, and after the incoming call is refused or answered and the call is ended, if the first time period is still not overrun, waiting for the first time period may be stopped, and the first operation is performed.

In at least one embodiment of the present disclosure, optionally, step 11 may include:
in a case in which a second condition is satisfied, performing the waiting-related operation before performing the first operation, where
the second condition may include at least one of the following:
the first communications device is in a mode using one card for sending;
the first communications device is of multi-subscription;
an emergency service of the first communications device is ended;
the first communications device needs to return to a network corresponding to the second subscription; and
a first subscription of the first communications device initiates an emergency service in a first network.

It can be understood that the first network is a network corresponding to the first subscription of the terminal.

In an implementation, the mode using one card for sending includes one of the following: a mode using one card for sending and both cards for receiving, and a mode using one card for sending and the other card for receiving.

In an implementation, the multi-subscription includes two or more subscriptions. For example, two cards mounted in a terminal are two subscriptions. Mounting a plurality of cards indicates a plurality of subscriptions. The card may be a USIM card, and the USIM card may be a physical card or may be an eSIM card.

Optionally, the foregoing first operation may include at least one of the following:
sending a detach request to a network element of the first network;
sending a deregistration request to the network element of the first network;
sending leaving-related information or a message related to requesting leaving to the network element of the first network;
sending an RRC connection release request to the network element of the first network;
sending an RRC connection suspend request to the network element of the first network (where the RRC connection suspend request may also be referred to as a request for entering an RRC non-active state); and
returning to a second network.

In an implementation, the leaving-related information may include terminal assistance information, and the terminal assistance information includes one of the following: a request for leaving, a request for a release, a request for suspension (also referred to as a request for entering a non-active state), leaving, a release, suspension.

In an implementation, detachment in the detach request message is not a type of detachment caused by turning off a phone, taking out a card, or the like. For example, a type of the detachment is normal detachment or detachment due to a plurality of cards. Deregistration in the deregistration request message is not a type of detachment caused by turning off a phone, taking out a card, or the like. For example, a type of the deregistration is normal deregistration or deregistration due to a plurality of cards.

In an embodiment of the present disclosure, the network element of the first network includes at least one of the following: a CN network element of the first network, and a RAN network element of the first network.

It can be easily understood that, in the embodiments, after a secondary card of a terminal completes an emergency call, performing of an operation related to returning to a primary card may be waited for a period of time, to deal with an emergency callback to the secondary card, such that dual SIM optimization is supported to optimize user experience with a dual SIM terminal.

Figure 2:
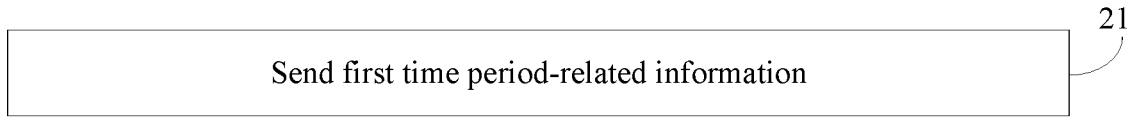
FIG. 2 is a schematic flowchart of another method for service optimization according to an embodiment of the present disclosure.

Refer to FIG. 2. An embodiment of the present disclosure provides a method for service optimization, applied to a second communications device, where the second communications device includes, but is not limited to a network element of a first network, and the network element of the first network may include any one of the following: a RAN network element, and a CN network element (such as MME or AMF). As shown in FIG. 2, the method includes:

Step 21: sending first time period-related information.

The first time period is a time period starting from a time point at which an emergency service is ended. The end of the emergency service may include any one of the following: an end of an emergency call, a release of a PDU session of an emergency call, and a release of a PDN connection of an emergency call.

In an implementation, the first time period-related information may include one of the following: duration for waiting, and an ending time point of waiting.

In an implementation, a terminal may obtain the first time period-related information from a second communications device, and determine the first time period based on the related information. In this way, after a secondary card of a terminal completes an emergency call, the terminal may perform an operation related to returning to a primary card after the first time period, to deal with an emergency callback to the secondary card.

It can be easily understood that, in the embodiments, dual SIM optimization can be supported, such that user experience with a dual SIM terminal is optimized.

The following describes the method for service optimization in the embodiments of the present disclosure with reference to a specific application scenario.

Figure 3:
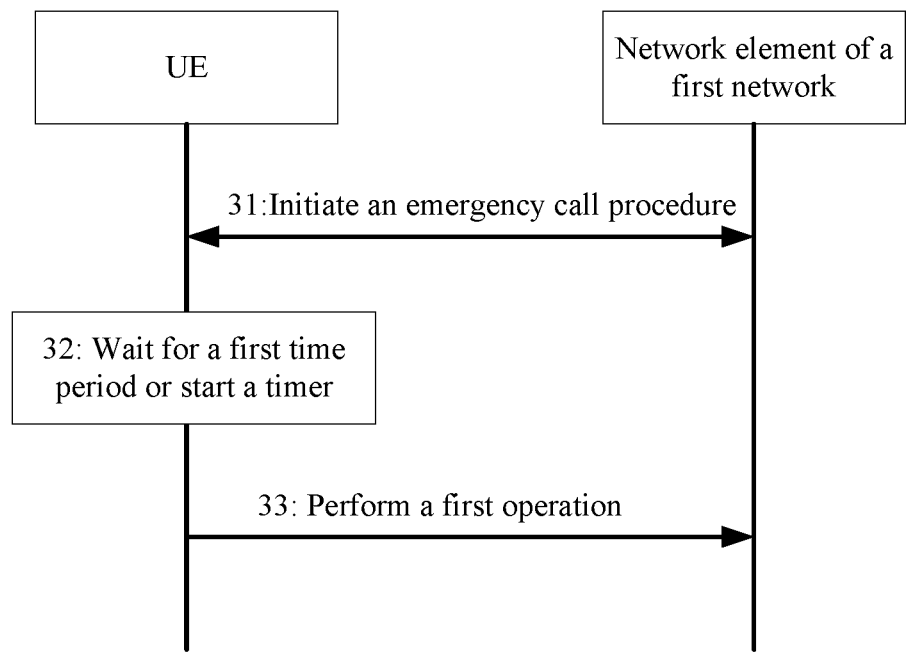
FIG. 3 is a schematic flowchart of a method for service optimization in an application scenario 1 according to an embodiment of the present disclosure.

In an application scenario 1 of the embodiments of the present disclosure, a process of UE paging by a network element of a first network (such as a CN network element) is mainly described. Refer to FIG. 3. The following steps are included:

Step 31: UE initiates an emergency call procedure to the first network.

Step 32: After the emergency service is ended, the UE waits for a first time period or starts a timer.

Optionally, the end of the emergency service may include any one of the following: an end of an emergency call, a release of a PDU session of an emergency call, and a release of a PDN connection of an emergency call.

Step 33: The UE performs a first operation after the timer has expired or the first time period is overrun.

Optionally, the first operation performed by the UE may be one of the following:
the UE sends a detach or deregistration request to the CN network element of the first network;
the UE sends a leaving request to the CN network element of the first network;
the UE sends a leaving request to the RAN network element of the first network;
the UE sends an RRC release request to the RAN network element of the first network;
the UE sends an RRC suspend request to the RAN network element of the first network, and makes a reservation for a preamble of a next random access; and
the UE sends terminal assistance information to the RAN network element of the first network, and the terminal assistance information includes one of the following: a request for leaving, a request for a release, a request for suspension (also referred to as a request for entering a non-active state), leaving, a release, suspension.

Figure 4:
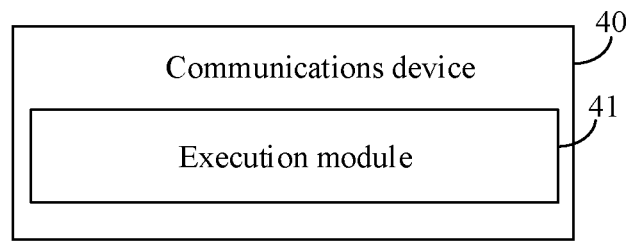
FIG. 4 is a diagram of a structure of a communications device according to an embodiment of the present disclosure.

Refer to FIG. 4, an embodiment of the present disclosure provides a communications device, where the communications device is a first communications device. As shown in FIG. 4, the communications device 40 includes:
an execution module 41, configured to perform a waiting-related operation before performing a first operation, where
the waiting-related operation is any one of the following:
an operation of waiting for a first time period;
an operation, before the first time period is overrun, when a first condition is satisfied, of stopping waiting for the first time period; and
an operation of waiting for an incoming call, where
the first time period is a time period starting from a time point at which an emergency service is ended.

Optionally, the first condition includes at least one of the following:
an incoming call is received but not taken;
an incoming call is received but refused to be taken; and
an incoming call is received and taken, and the incoming call is ended, where
the first communications device initiates an outgoing call by using a second subscription.

Optionally, the execution module 41 is further configured to:
in a case in which a second condition is satisfied, perform the waiting-related operation before performing the first operation, where
the second condition includes at least one of the following:
the first communications device is in a mode using one card for sending;
the first communications device is of multi-subscription;
an emergency service of the first communications device is ended;
the first communications device needs to return to a network corresponding to the second subscription; and
a first subscription of the first communications device initiates an emergency service in a first network.

Optionally, the first time period is configured by the first communications device; or
the first time period is obtained from first time period-related information received from a second communications device.

Optionally, the first operation includes at least one of the following:
sending a detach request to a network element of the first network;
sending a deregistration request to the network element of the first network;
sending leaving-related information or a message related to requesting leaving to the network element of the first network;
sending an RRC connection release request to the network element of the first network;
sending an RRC connection suspend request to the network element of the first network; and
returning to a second network.

In this embodiment, the communications device 40 can implement every process implemented in the method embodiments as shown in FIG. 1 of the present disclosure, and achieve same beneficial effects. To avoid repetition, details are not described herein again.

Figure 5:
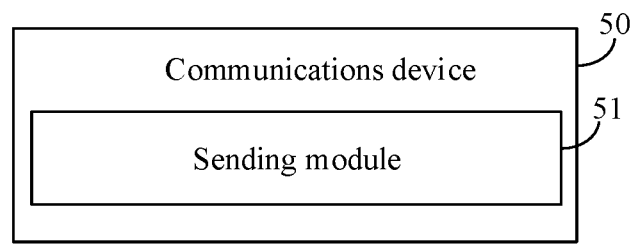
FIG. 5 is a diagram of a structure of another communications device according to an embodiment of the present disclosure.

Refer to FIG. 5, an embodiment of the present disclosure provides a communications device, where the communications device is a second communications device. As shown in FIG. 5, the communications device 50 includes:
a sending module 51, configured to send first time period-related information, where
the first time period is a time period starting from a time point at which an emergency service is ended.

In an implementation, the first time period-related information may include one of the following: duration for waiting, and an ending time point of waiting.

In this embodiment, the communications device 50 can implement every process implemented in the method embodiments as shown in FIG. 2 of the present disclosure, and achieve same beneficial effects. To avoid repetition, details are not described herein again.

Figure 6:
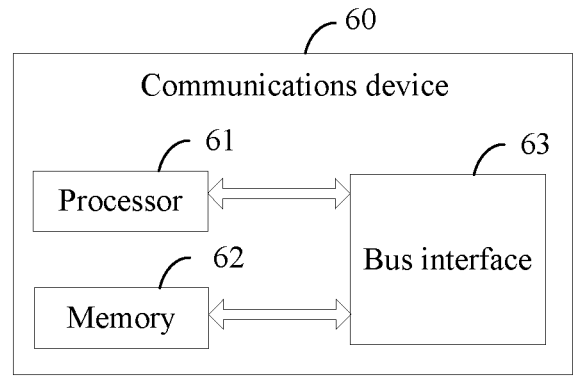
FIG. 6 is a diagram of a structure of another communications device according to an embodiment of the present disclosure.

Refer to FIG. 6. FIG. 6 is a schematic diagram of a structure of another communications device according to an embodiment of the present disclosure. As shown in FIG. 6, the communications device 60 includes: a processor 61, a memory 62, and a computer program stored in the memory 62 and executable on the processor, where various components of the communications device 60 are coupled together through a bus interface 63. When the computer program is executed by the processor 61, various processes implemented in the method embodiment as shown in FIG. 1 can be implemented or various processes implemented in the method embodiment as shown in FIG. 2 can be implemented, and same technical effects can be achieved. To avoid repetition, details are not described herein again.

An embodiment of the present disclosure further provides a computer-readable storage medium. The computer-readable storage medium stores a computer program, and the computer program, when executed by a processor, various processes implemented in the method embodiment shown in FIG. 1 are implemented or various processes implemented in the method embodiment as shown in FIG. 2 are implemented, and same technical effects can be achieved. To avoid repetition, details are not described herein. The computer-readable storage medium is, for example, a read-only memory (ROM), a random access memory (RAM), a magnetic disk, or an optical disc.

It should be noted that in this specification, terms "include", "comprise" or any other variants thereof are intended to cover non-exclusive inclusion, so that a process, a method, an article or an apparatus that includes a series of elements not only includes those elements, but also includes other elements that are not explicitly listed, or includes inherent elements of the process, method, article, or apparatus. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may derive many forms without departing from the aim of the present disclosure and the protection scope of the claims, all of which shall fall within the protection of the present disclosure.

The invention claimed is:

1. A method for service optimization, performed by a first communications device, wherein the first communications device is a terminal having a plurality of subscriptions and the method comprises:

after an emergency service initiated in a first network is ended, performing a waiting-related operation before performing a first operation, wherein the waiting-related operation is any one of the following:

an operation of waiting for a first time period;

an operation, before the first time period is overrun, when a first condition is satisfied, of stopping waiting for the first time period; and an operation of waiting for an incoming call, wherein the first time period is a time period starting from a time point at which the emergency service is ended;

wherein the first operation comprises at least one of the following:

sending leaving-related information or a message related to requesting leaving to the network element of the first network; wherein the leaving-related information comprises at least one of the following: a request for leaving, a request for a release, a request for suspension; or returning to a second network;

wherein the first network is a communications network corresponding to a first subscription of the first communications device, the second network is a communications network corresponding to a second subscription of the first communications device.

2. The method according to claim 1, wherein the first condition comprises at least one of the following:

an incoming call is received but not taken;

an incoming call is received but refused to be taken; or an incoming call is received and taken, and the incoming call is ended, wherein the first communications device initiates an outgoing call by using a second subscription.

3. The method according to claim 1, wherein the performing a waiting-related operation before performing a first operation comprises:

in a case in which a second condition is satisfied, performing the waiting-related operation before performing the first operation, wherein the second condition comprises at least one of the following:

the first communications device is in a mode using one card for sending;

the first communications device is of multi-subscription;

an emergency service of the first communications device is ended;

the first communications device needs to return to a network corresponding to the second subscription; or a first subscription of the first communications device initiates an emergency service in the first network.

4. The method according to claim 1, wherein the first time period is configured by the first communications device;

or the first time period is obtained from first time period-related information received from a second communications device.

5. The method according to claim 1, wherein the first operation further comprises at least one of the following:

sending a detach request to a network element of the first network;

sending a deregistration request to the network element of the first network;

sending a radio resource control RRC connection release request to the network element of the first network; or sending an RRC connection suspend request to the network element of the first network.

6. A communications device, comprising a processor, a memory, and a computer program stored in the memory and executable on the processor, wherein the first communications device is a terminal having a plurality of subscriptions, and the computer program, when executed by the processor, implements:
   after an emergency service initiated in a first network is ended, performing a waiting-related operation before performing a first operation, wherein
   the waiting-related operation is any one of the following:
   an operation of waiting for a first time period;
   an operation, before the first time period is overrun, when a first condition is satisfied, of stopping waiting for the first time period; and
   an operation of waiting for an incoming call, wherein the first time period is a time period starting from a time point at which the emergency service is ended;
   wherein the first operation comprises at least one of the following:
   sending leaving-related information or a message related to requesting leaving to the network element of the first network; wherein the leaving-related information comprises at least one of the following: a request for leaving, a request for a release, a request for suspension; and
   returning to a second network;
   wherein the first network is a communications network corresponding to a first subscription of the first communications device, the second network is a communications network corresponding to a second subscription of the first communications device.

7. The communications device according to claim 6, wherein the first condition comprises at least one of the following:
   an incoming call is received but not taken;
   an incoming call is received but refused to be taken; or
   an incoming call is received and taken, and the incoming call is ended, wherein
   the first communications device initiates an outgoing call by using a second subscription.

8. The communications device according to claim 6, wherein the computer program, when executed by the processor, further implements:
   in a case in which a second condition is satisfied, performing the waiting-related operation before performing the first operation, wherein
   the second condition comprises at least one of the following:
   the first communications device is in a mode using one card for sending;
   the first communications device is of multi-subscription;
   an emergency service of the first communications device is ended;
   the first communications device needs to return to a network corresponding to the second subscription; or
   a first subscription of the first communications device initiates an emergency service in the first network.

9. The communications device according to claim 6, wherein
   the first time period is configured by the first communications device;
   or
   the first time period is obtained from first time period-related information received from a second communications device.

10. The communications device according to claim 6, wherein the first operation further comprises at least one of the following:
    sending a detach request to a network element of the first network;
    sending a deregistration request to the network element of the first network;
    sending a radio resource control RRC connection release request to the network element of the first network; or
    sending an RRC connection suspend request to the network element of the first network.

11. A non-transitory computer-readable storage medium, wherein the non-transitory computer-readable storage medium stores a computer program, and the computer program, when executed by a processor of a first communications device being a terminal having a plurality of subscriptions, implements:
    after an emergency service initiated in a first network is ended, performing a waiting-related operation before performing a first operation, wherein
    the waiting-related operation is any one of the following:
    an operation of waiting for a first time period;
    an operation, before the first time period is overrun, when a first condition is satisfied, of stopping waiting for the first time period; and
    an operation of waiting for an incoming call, wherein
    the first time period is a time period starting from a time point at which the emergency service is ended;
    wherein the first operation comprises at least one of the following:
    sending leaving-related information or a message related to requesting leaving to the network element of the first network; wherein the leaving-related information comprises at least one of the following: a request for leaving, a request for a release, a request for suspension; or
    returning to a second network;
    wherein the first network is a communications network corresponding to a first subscription of the first communications device, the second network is a communications network corresponding to a second subscription of the first communications device.

12. The non-transitory computer-readable storage medium according to claim 11, wherein the first condition comprises at least one of the following:
    an incoming call is received but not taken;
    an incoming call is received but refused to be taken; or
    an incoming call is received and taken, and the incoming call is ended, wherein
    the first communications device initiates an outgoing call by using a second subscription.

13. The non-transitory computer-readable storage medium according to claim 11, wherein the performing a waiting-related operation before performing a first operation comprises:
    in a case in which a second condition is satisfied, performing the waiting-related operation before performing the first operation, wherein
    the second condition comprises at least one of the following:
    the first communications device is in a mode using one card for sending;
    the first communications device is of multi-subscription;
    an emergency service of the first communications device is ended;
    the first communications device needs to return to a network corresponding to the second subscription; or a first subscription of the first communications device initiates an emergency service in a first network.

14. The non-transitory computer-readable storage medium according to claim 11, wherein
the first time period is configured by the first communications device;
or
the first time period is obtained from first time period-related information received from a second communications device.

15. The non-transitory computer-readable storage medium according to claim 11, wherein the first operation comprises at least one of the following:
sending a detach request to a network element of the first network;
sending a deregistration request to the network element of the first network;
sending a radio resource control RRC connection release request to the network element of the first network; or
sending an RRC connection suspend request to the network element of the first network.

\* \* \* \* \*